(12) United States Patent
Weselý et al.

(10) Patent No.: US 11,001,290 B2
(45) Date of Patent: May 11, 2021

(54) ADJUSTABLE STEERING COLUMN HAVING AT LEAST ONE MRF ACTUATOR

(71) Applicants: THYSSENKRUPP PRESTA AG, Eschen (LI); thyssenkrupp AG, Essen (DE)

(72) Inventors: Alexander Weselý, Fishers, IN (US); Daniel Kreutz, Feldkirch (AT); Hansjoerg Sulser, Gamprin (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 34 days.

(21) Appl. No.: 16/620,939

(22) PCT Filed: Jun. 26, 2018

(86) PCT No.: PCT/EP2018/067092
§ 371 (c)(1),
(2) Date: Dec. 10, 2019

(87) PCT Pub. No.: WO2019/002279
PCT Pub. Date: Jan. 3, 2019

(65) Prior Publication Data
US 2020/0189643 A1 Jun. 18, 2020

(30) Foreign Application Priority Data
Jun. 29, 2017 (DE) .................. 10 2017 114 517.6

(51) Int. Cl.
*B62D 1/18* (2006.01)
*B62D 1/184* (2006.01)
(Continued)

(52) U.S. Cl.
CPC ................. *B62D 1/18* (2013.01); *B62D 1/10* (2013.01); *B62D 1/184* (2013.01); *F16C 32/0637* (2013.01); *F16C 2326/24* (2013.01)

(58) Field of Classification Search
CPC .......... B62D 1/184; B62D 1/18; B62D 1/181; B62D 1/185; F16D 57/002; F16D 37/008;
(Continued)

(56) References Cited

U.S. PATENT DOCUMENTS

2004/0083844 A1* 5/2004 Krizan ............... B62D 1/16
74/492
2004/0123695 A1* 7/2004 Knott .................. B62D 1/184
74/493
(Continued)

FOREIGN PATENT DOCUMENTS

DE 10 2004 009 906 B 7/2005
DE 102004046073 A1 * 3/2006 ............. F16F 9/535
(Continued)

OTHER PUBLICATIONS

English Translation of International Search Report issued in PCT/EP2018/067092, dated Sep. 24, 2018 (dated Oct. 1, 2018).

*Primary Examiner* — Ruth Ilan
*Assistant Examiner* — Matthew D Lee
(74) *Attorney, Agent, or Firm* — thyssenkrupp North America, LLC

(57) ABSTRACT

A steering column may include a steering spindle that is surrounded by a casing tube and is connected to a steering wheel, a guide clamp in which the casing tube is guided displaceably along a longitudinal axis of the steering spindle. The guide clamp may be mounted pivotably about a pivot axis in a holding part that is connectable to a chassis of the motor vehicle. The position of the casing tube may be adjustable relative to the holding part, and a blocking device may be arranged between the casing tube and the holding part. The blocking device may comprise a threaded rod engaged with a spindle nut. The spindle nut may be mounted in a rolling bearing. Rolling bodies of the rolling bearing (Continued)

US 11,001,290 B2
Page 2 may be at least partially surrounded by a magnetorheological fluid, and the blocking device may comprise an electromagnet.

15 Claims, 3 Drawing Sheets

(51) Int. Cl.
*B62D 1/10* (2006.01)
*F16C 32/06* (2006.01)

(58) Field of Classification Search
CPC .. F16D 37/02; F16C 32/0637; F16F 2224/045
See application file for complete search history.

(56) References Cited

U.S. PATENT DOCUMENTS

| | | | |
|---|---|---|---|
| 2010/0045010 A1* | 2/2010 | Battlogg | B60R 19/32 280/742 |
| 2016/0153508 A1* | 6/2016 | Battlogg | A61F 2/6607 74/553 |
| 2017/0361863 A1* | 12/2017 | Rouleau | B62D 1/185 |
| 2018/0251147 A1* | 9/2018 | Heitz | B62D 1/185 |
| 2019/0031224 A1* | 1/2019 | Huber | B62D 1/181 |
| 2019/0291773 A1* | 9/2019 | Specht | B62D 1/181 |
| 2020/0039563 A1* | 2/2020 | Cana | B62D 1/185 |
| 2020/0346682 A1* | 11/2020 | Forte | B62D 5/0409 |

FOREIGN PATENT DOCUMENTS

| | | | | |
|---|---|---|---|---|
| DE | 10 2007 006 015 A | 8/2008 | | |
| DE | 10 2010 020 086 A | 11/2011 | | |
| DE | 10 2010 055 833 A | 3/2012 | | |
| DE | 10 2014 104 362 A | 10/2015 | | |
| DE | 10 2015 007 784 A | 12/2016 | | |
| DE | 102017104510 A1 * | 9/2018 | ........... | B60R 25/021 |
| FR | 2881097 A1 * | 7/2006 | ............. | B62D 1/187 |
| WO | 00/37298 A | 6/2000 | | |

* cited by examiner

ADJUSTABLE STEERING COLUMN HAVING AT LEAST ONE MRF ACTUATOR

CROSS REFERENCE TO RELATED APPLICATIONS

This application is a U.S. National Stage Entry of International Patent Application Serial Number PCT/EP2018/067092, filed Jun. 26, 2018, which claims priority to German Patent Application No. DE 10 2017 114 517.6, filed Jun. 29, 2017, the entire contents of both of which are incorporated herein by reference.

FIELD

The present disclosure generally relates to steering columns, including adjustable steering columns that utilize MRF actuators.

BACKGROUND

Motor vehicle steering columns which comprise a holding part connectable to the chassis of the motor vehicle and a guide clamp which is held on said holding part and is adjustable in relation to the holding part are known. The guide clamp supports a steering spindle which serves for introducing a steering movement from a steering wheel into a steering system.

It is known to configure the guide clamp to be adjustable in relation to a casing tube or the holding part in order to be able to adapt the position of a steering wheel held on the steering spindle to the respective seat position of a driver of the motor vehicle. Furthermore, conventional steering columns additionally comprise energy absorption devices which, in the event of a crash, damp the loading of a driver upon impact against the steering wheel or the steering column.

In the prior art, DE 10 2010 020 086 A1 discloses a controllable energy absorption device for an adjustable steering column. The energy absorption device here comprises a piston-cylinder unit which is filled with a magnetorheological fluid. During a relative movement of the piston-cylinder unit, the piston is displaced in relation to the cylinder, and therefore the magnetorheological fluid is pushed through a narrow point into an outlet channel. The viscosity of the magnetorheological fluid can be changed by the magnetic field of a coil, and therefore the force on the piston-cylinder unit and thus the deceleration of the moving masses can also be changed. A disadvantage of this solution is that a locking device additionally has to be provided which releases the steering column in a release position for adjustment purposes and blocks the steering column in a fixing position. Said locking device requires a large construction space and introduces an additional mass into the steering column.

Thus a need exists for an adjustable steering column which is lightweight and space-saving and comprises a controllable energy absorption device.

DETAILED DESCRIPTION

Figure 1:
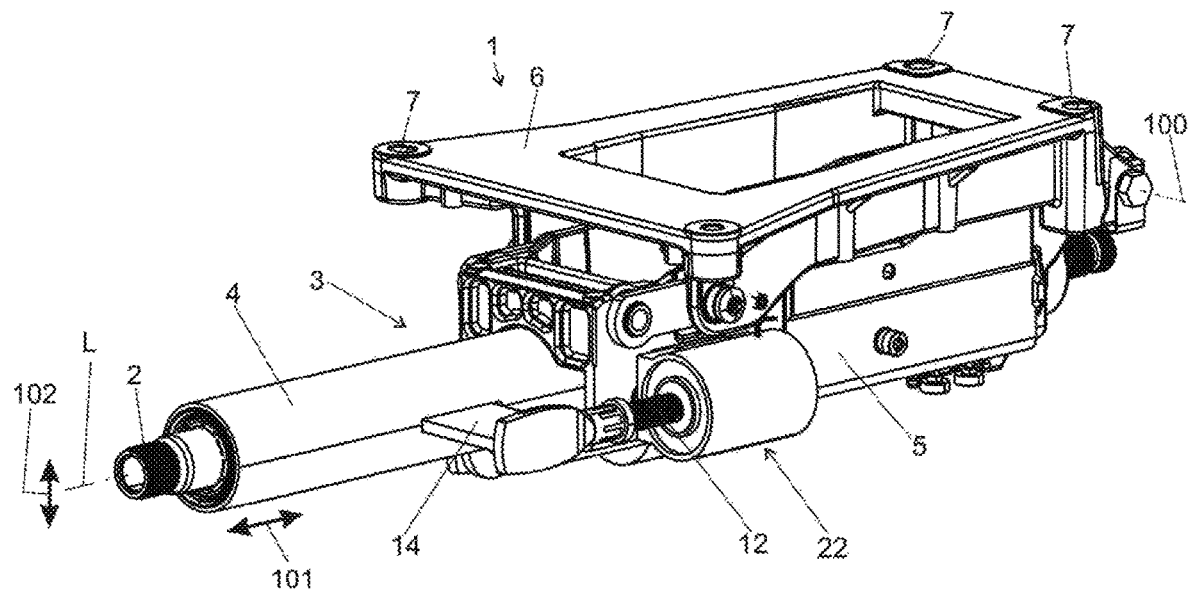
FIG. 1 is a perspective view of an example steering column with a blocking device for longitudinal adjustment direction and a blocking device for height adjustment direction.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, an adjustable steering column for a motor vehicle is provided, comprising a steering spindle which is surrounded by a casing tube and is connected to a steering wheel, and a guide clamp in which the casing tube is guided displaceably along the longitudinal axis of the steering spindle, wherein the guide clamp is mounted pivotably about a pivot axis in a holding part which is connectable to a chassis of the motor vehicle, and wherein the position of the casing tube is adjustable in relation to the holding part, wherein a blocking device is arranged between the casing tube and the holding part, wherein the blocking device comprises a threaded rod which is in engagement with a spindle nut, and wherein the spindle nut is mounted in a rolling bearing, wherein the rolling bodies of the rolling bearing are at least partially surrounded by a magnetorheological fluid, and the blocking device comprises an electromagnet. The viscosity of the magnetorheological fluid can be controlled by means of the electromagnet, as a result of which, in turn, the brake away torque of the rolling bearing can be set, and therefore the adjustment of the steering column can be blocked (fixing position) or released (release position). In the fixing position of the blocking device, the viscosity of the magnetorheological fluid is so greatly increased by means of the electromagnet in relation to the viscosity of the magnetorheological fluid in the release position that spinning of the rolling bearing and thus of the spindle nut is possible only under a high application of force. The magnetorheological fluid can comprise ferromagnetic particles which are braced by the influence of a magnetic field provided by means of the electromagnet, and therefore the viscosity of the magnetorheological fluid can be adapted.

The casing tube can therefore be fixed in relation to the holding part or released for an adjustment. An additional fixing device, which uses, for example, a clamping lever, can therefore be dispensed with.

The blocking device is arranged between the casing tube and the holding part. The blocking device can therefore either be arranged and connected directly between the casing tube and the holding part. However, the blocking device can also be connected to the casing tube and the guide clamp, wherein the guide clamp is connected in turn to the holding part via the pivot axis such that the blocking device is arranged between the casing tube and the holding part, but is connected to the holding part with the interconnection of the guide clamp. The blocking device can likewise also be connected to the holding part and the guide clamp, wherein the casing tube is supported in the guide clamp in the pivoting direction such that the blocking device is arranged between the casing tube and the holding part, but is connected to the casing tube with the interconnection of the guide clamp.

The guide clamp may alternatively also be referred to as box-section swing arm or outer casing tube.

The spindle nut is preferably mounted in a transmission housing so as to be rotatable and positionally fixed with respect to the guide clamp.

The threaded rod is preferably movable without self-locking. The thread via which the threaded rod and the spindle nut are in engagement with each other is therefore designed in such a manner that the pitch angle of the threaded flank is smaller than the arc tangent of the coefficient of sliding friction which prevails between the threaded rod and the spindle nut.

In a preferred embodiment, two blocking devices are provided, wherein the length of the steering column can be fixed by a first blocking device and the height by a second blocking device. It can therefore be provided that the first blocking device is arranged between the casing tube and the guide clamp and the second blocking device is arranged between the guide clamp and the holding part.

It is advantageous if the adjustment of the length of the steering column leads to a displacement of the casing tube in relation to the guide clamp.

Preferably, the rolling bodies are produced from a magnetizable material and the electromagnet is configured to magnetize or to demagnetize the rolling bodies. This advantageous development provides the possibility of switching over between the fixing position and the release position without the electromagnet having to be permanently energized in one of the positions.

Furthermore, a method for controlling an adjustable steering column of a motor vehicle is provided, comprising a steering spindle which is surrounded by a casing tube and is connected to a steering wheel, and a guide clamp in which the casing tube is guided displaceably along the longitudinal axis of the steering spindle, wherein the guide clamp is mounted pivotably about a pivot axis in a holding part which is connectable to a chassis of the motor vehicle, and wherein the position of the casing tube is adjustable in relation to the holding part, wherein a blocking device (22, 122) is arranged between the casing tube (4) and the holding part (6), wherein the blocking device (22, 122) comprises a threaded rod which is in engagement with a spindle nut, and the blocking device can be switched over between a fixing position and a release position, wherein, in the fixing position, the adjustment of the steering column is blocked and, in the release position, the adjustment of the steering column is released. The method comprises the following steps:

providing a rolling bearing which supports the spindle nut, wherein the rolling bodies of the rolling bearing are at least partially surrounded by a magnetorheological fluid, during the transfer of the blocking device into the fixing position, magnetizing the rolling bodies by means of an electromagnet in order to increase the viscosity of the magnetorheological fluid in such a manner that the rotation of the spindle nut is blocked, during the transfer of the blocking device into the release position, demagnetizing the rolling bodies by means of the electromagnet in order to reduce the viscosity of the magnetorheological fluid in such a manner that the rotation of the spindle nut is released.

It is advantageous here if the spindle nut is mounted in a transmission housing so as to be rotatable and positionally fixed with respect to the guide clamp, and therefore an axial movement of the threaded rod relative to the spindle nut leads to a rotation of the spindle nut.

The threaded rod is preferably movable without self-locking. As a result, a smooth manual adjustment of the casing tube in relation to the holding part in the release position of the blocking device can be ensured.

In a preferred embodiment, two blocking devices are provided, wherein the length of the steering column can be fixed by a first blocking device and the height by a second blocking device. Both the height adjustment direction and the longitudinal adjustment direction therefore each comprise a blocking device with a magnetorheological fluid.

It is advantageous if, in the event of a crash, the electromagnet is energized in such a manner that the spindle nut is rotatable with a predefined braking moment. The effect which can be achieved by this is that, in the event of a crash, the casing tube is shifted in relation to the holding part, wherein the threaded rod, and therefore the casing tube, can be displaced by the braking moment only under an increased application of force, and therefore energy absorption takes place. The crash level can be adapted by adaptation of the energizing of the electromagnet, and therefore an energy absorption adapted to the accident and to the driver takes place.

It can preferably be additionally provided to provide a motorized adjustment drive for the adjustment in the height adjustment direction and also in the longitudinal adjustment direction. The motorized adjustment drive makes it possible to adjust the casing tube in relation to the holding part, for example by means of an electric motor, when the blocking devices are in the release position. The adjustment by means of a motorized adjustment drive is known to a person skilled in the art, for example, from DE102014104362A1.

Figure 2:
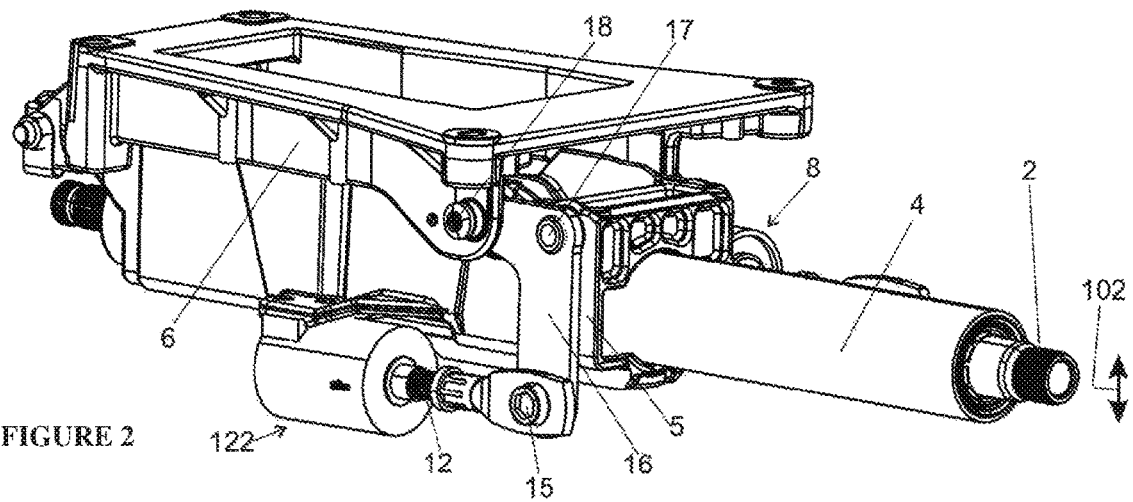
FIG. 2 is another perspective view of the steering column according to FIG. 1 with a blocking device for longitudinal adjustment direction and a blocking device for height adjustment direction.

FIG. 1 and FIG. 2 illustrate a steering column 1 of a motor vehicle, which comprises a steering spindle 2 which is mounted rotatably about its axis of rotation in a steering spindle bearing unit 3, comprising a casing tube 4. The casing tube 4 is guided displaceably along the longitudinal axis L of the steering spindle 2 in a guide clamp 5, which may also be referred to as outer casing tube or box-section swing arm. The guide clamp 5 is mounted pivotably about a pivot axis 100 in a holding part 6. The holding part 6 can be fastened to the body (not illustrated) at fastening points 7. The rotational movement introduced into the steering spindle 2 by a driver via a steering wheel (not illustrated) is introduced into the steering mechanism (not illustrated). In order to increase the comfort for the driver, the height of the steering column 1 can be adjusted in the height adjustment direction 101 and the length in the longitudinal adjustment direction 102. In order to realize the adjustment in the height adjustment direction 101, the casing tube 4 is pivotable together with the guide clamp 5 about the pivot axis 100.

A first blocking device 22 for fixing the casing tube 4 in relation to the guide clamp 5 in the longitudinal adjustment direction 101 and therefore for fixing the casing tube 4 in relation to the holding part 6 is provided, wherein the first blocking device 22 comprises a threaded rod 12 and a spindle nut 13.

The threaded rod 12 is connected to the casing tube 4 via a coupling lever 14, and therefore a displacement of the casing tube 4 in relation to the guide clamp 5 leads to a displacement of the coupling lever 14 in relation to the guide clamp 5.

The threaded rod 12 is held on the coupling lever 14 and extends in the longitudinal adjustment direction 102 and therefore in the direction of the longitudinal axis L.

A second blocking device 122 for fixing the casing tube 4 and the guide clamp 5 in the height adjustment direction 102 in relation to the holding part 6 is provided, wherein the second blocking device 122 comprises a threaded rod 12 and a spindle nut 13.

The spindle nut 13 is set into rotation by displacement of the threaded rod 12 in the axial direction. The threaded rod 12 of the second blocking device 122 is connected to an adjustment lever 16 via a joint 15. The adjustment lever 16 is held pivotably on the holding part 6 in a joint axis 18 and on the guide clamp 5 in a joint axis 17. The effect achieved by this is that the guide clamp 5 is pivoted in relation to the holding part 6 via the spindle nut 113 and the threaded rod 112 if the casing tube 4 is pivoted about the pivot axis 100 in relation to the holding part 6.

Figure 3:
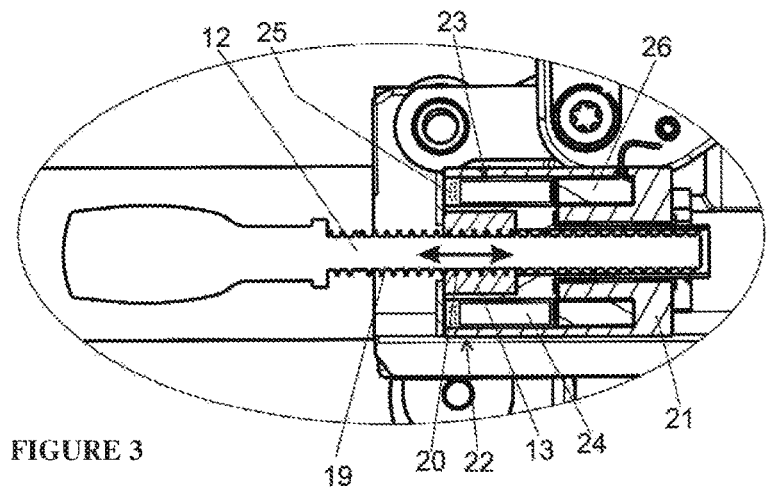
FIG. 3 is a detailed longitudinal sectional view through an example blocking device of the steering column.
Figure 4:
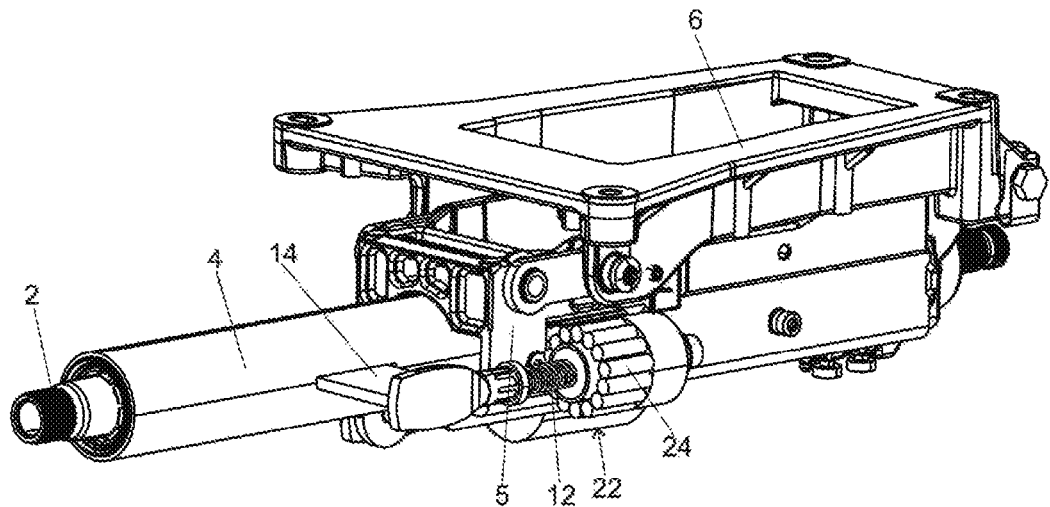
FIG. 4 is a perspective view of the steering column of FIG. 1 without covering the blocking device.
Figure 5:
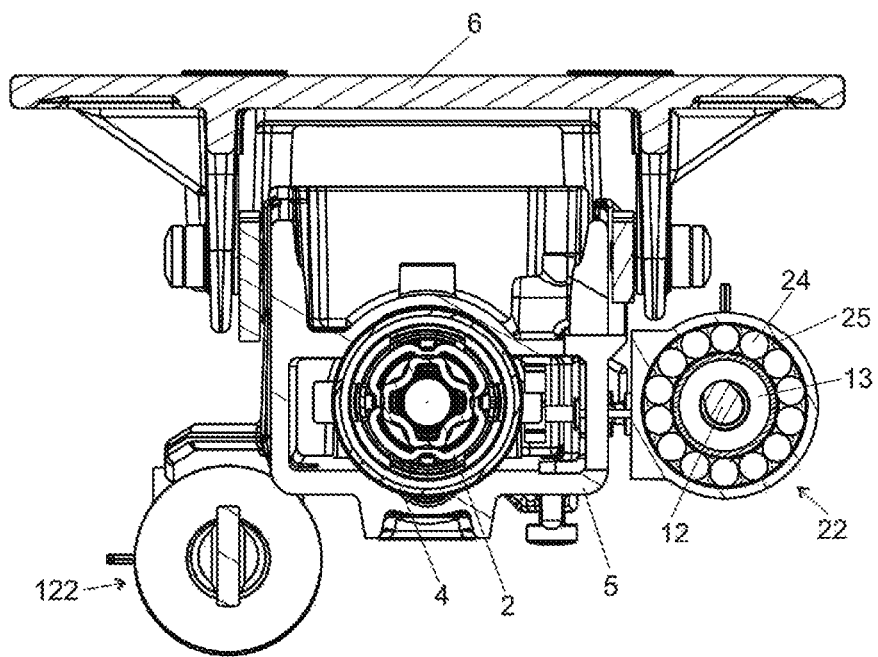
FIG. 5 is a cross-sectional view through the steering column according to FIGS. 1 and 2.
Figure 6:
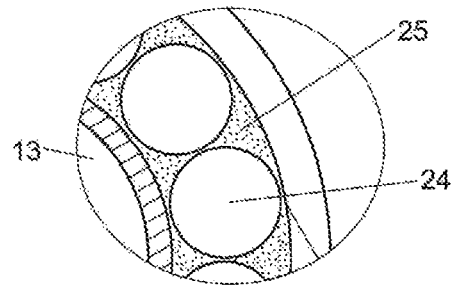
FIG. 6 is a detailed cross-sectional view of a rolling bearing of a blocking device.

FIG. 3 shows the design of the first blocking device 22 in detail. The design of the second blocking device 122 corresponds to the design of the first blocking device 22. The threaded rod 12 engages by means of an external thread 19 into an internal thread 20 of a spindle nut 13, 113. The thread is configured in such a manner that no self-locking is present. The spindle nut 13 is mounted in a transmission housing 21 in a rotatable, but positionally fixed, manner, and therefore an axial movement of the threaded rod 12 leads to a rotation of the spindle nut 13 relative to the threaded rod 12.

The blocking device 22, 122 can be switched over between a fixing position and a release position. In the release position, the longitudinal and/or height adjustment of the steering column can take place. In the fixing position, the blocking device 22, 122 prevents an adjustment of the threaded rod 12.

As FIGS. 3 to 6 show, the blocking device 22, 122 comprises a rolling bearing 23 which supports the spindle nut 13, wherein the rolling bodies 24 are at least partially surrounded by a magnetorheological fluid 25. Furthermore, an electromagnet 26 (electric coil) is provided on an end side of the rolling bearing 23 level with the rolling bodies 24. The rolling bodies 24, which are designed as a permanent magnet, are magnetized or demagnetized via temporary and correspondingly strong magnetic pulses of the electric coil 26. The existing magnetic field of the magnetized rolling bodies 24 leads to linking of the magnetorheological particles of the magnetorheological fluid 25, said particles being located between the rolling bodies 24. Linking of the magnetorheological particles increases the viscosity, which leads to the adjustment device being fixed since the rotation of the spindle nut 13 is blocked. The blocking device 22, 122 can therefore be switched over between a fixing position and a release position. In the release position, the longitudinal and/or height adjustment of the steering column can take place. In the fixing position, the blocking device 22, 122 prevents an adjustment of the threaded rod 12 since the viscosity is increased by the linking of the magnetorheological particles, which leads to the blocking device being fixed since the rotation of the spindle nut 13 is blocked. If the rolling bodies 24 designed as a permanent magnet are demagnetized by the electromagnet 26, the blocking device is transferred into the release position and the casing tube 4 can be adjusted in relation to the holding part.

The magnetorheological fluid refers to a suspension of small magnetically polarizable particles which are finely distributed in a carrier fluid. If a magnetic field acts on the fluid, the particles are polarized and form chains in the direction of the field lines. By means of the orientation of the particles, the suspension becomes more viscous as the field strength increases. A magnetorheological fluid (MRF) in a magnetic field can therefore be drastically, rapidly and reversibly changed. In order to avoid negative properties, such as abrasion, sedimentation and aging, the fluids are stabilized with additives.

The first and second blocking devices 22, 122 also serve as an energy absorption device. Since the blocking device 22, 122 or the rolling bearing 23 has a basic friction with an adjustable basic torque it already incorporates obstruction of the steering column. In the event of a crash, the blocking device 22, 122 can be used as a pure controlled system. In this case, the electromagnet 26 is energized in such a manner that the spindle nut 13, 113 can be rotated with a certain braking moment, and therefore the components of the steering column can be shifted in relation to one another and, in the process, energy is absorbed. Different forces can be realized depending on the voltage applied.

Figure 7:
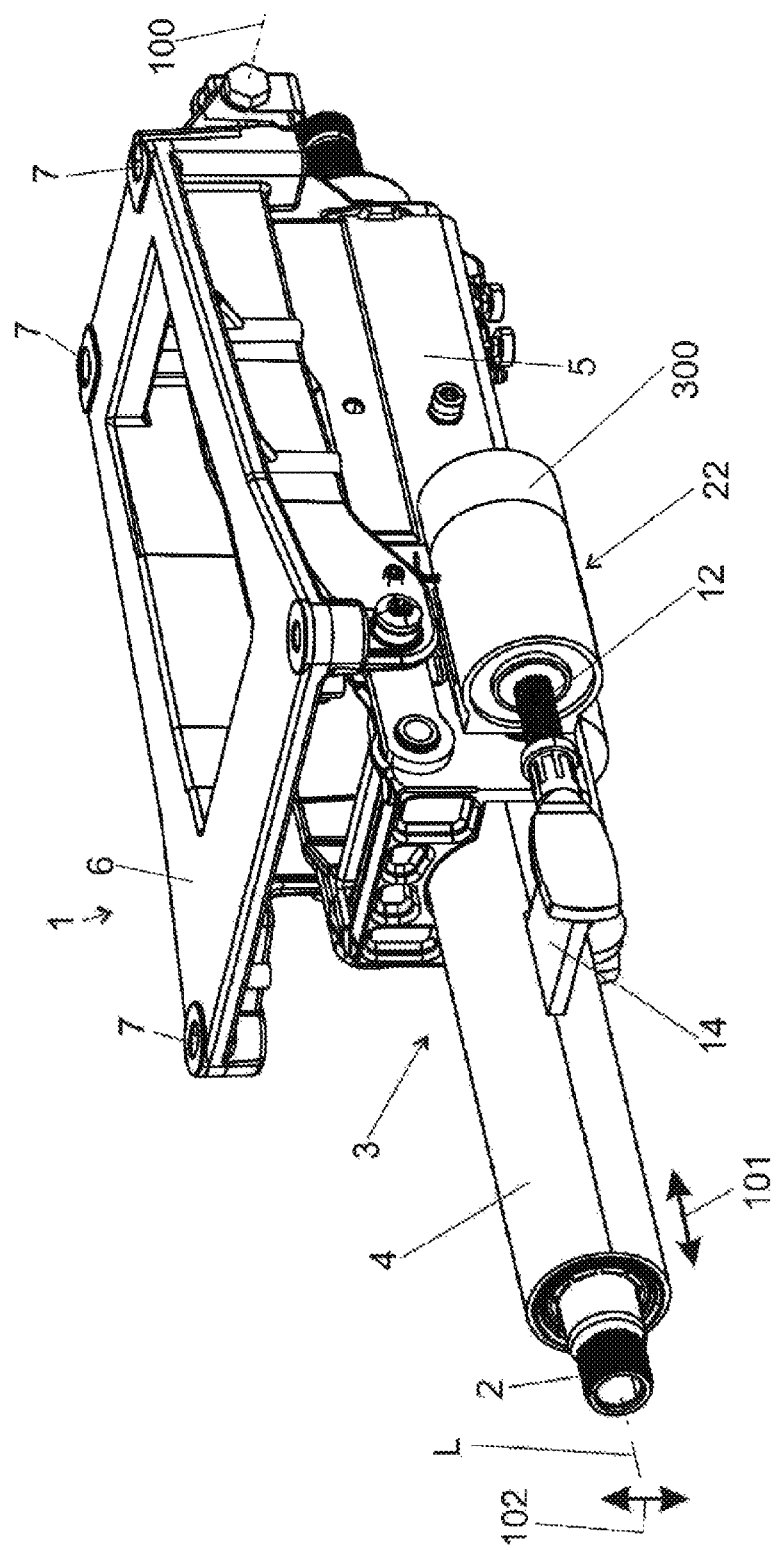
FIG. 7 is a perspective view of another example steering column with a blocking device for longitudinal adjustment direction and a blocking device for height adjustment direction and with motorized adjustment drives.

FIG. 7 shows a three-dimensional illustration of a steering column in a second embodiment with a first blocking device 22 for the longitudinal adjustment direction and a second blocking device 122 for the height adjustment direction and with motorized adjustment drives for the longitudinal adjustment and a motorized adjustment drive for the height adjustment. The motorized adjustment drive makes it possible to adjust the casing tube 4 in relation to the holding part 6 by means of an electric motor 300 when the blocking device 22 is in the release position. It is an advantage of the invention that both the blocking device and the energy absorption device are formed compactly and in a manner saving on construction space as one unit.

The present steering column with one or two blocking device(s) can be used in electromechanical motor vehicle servo steering systems, but also in steer-by-wire steering systems of a motor vehicle.

What is claimed is:

1. A steering column for a motor vehicle, the steering column comprising:
   a steering spindle that is surrounded by a casing tube and connected to a steering wheel;
   a guide clamp in which the casing tube is guided displaceably along a longitudinal axis of the steering spindle, wherein the guide clamp is mounted pivotably about a pivot axis in a holding part that is connectable to a chassis of the motor vehicle, wherein a position of the casing tube is adjustable relative to the holding part; and
   a blocking device disposed between the casing tube and the holding part, wherein the blocking device comprises a threaded rod engaged with a spindle nut, wherein the spindle nut is mounted in a rolling bearing, wherein the rolling bodies of the rolling bearing are at least partially surrounded by magnetorheological fluid, wherein the blocking device comprises an electromagnet.

2. The steering column of claim 1 wherein the spindle nut is mounted in a transmission housing so as to be rotatable and positionally fixed relative to the guide clamp, wherein axial movement of the threaded rod relative to the spindle nut leads to rotation of the spindle nut.

3. The steering column of claim 1 wherein the threaded rod is movable without self-locking.

4. The steering column of claim 1 wherein the blocking device is a first blocking device, the steering column comprising a second blocking device, wherein a length of the steering column is configured to be fixed by the first blocking device and a height of the steering column is configured to be fixed by the second blocking device.

5. The steering column of claim 1 wherein the rolling bodies comprise a magnetizable material, wherein the electromagnet is configured to magnetize or to demagnetize the rolling bodies.

6. A method for controlling an adjustable steering column of a motor vehicle, the adjustable steering column comprising a steering spindle that is surrounded by a casing tube and is connected to a steering wheel, a guide clamp in which the casing tube is guided displaceably along a longitudinal axis of the steering spindle, wherein the guide clamp is mounted pivotably about a pivot axis in a holding part that is connectable to a chassis of the motor vehicle, wherein a position of the casing tube is adjustable relative to the holding part, wherein a blocking device is disposed between the casing tube and the holding part, the blocking device comprising a threaded rod that is engaged with a spindle nut, wherein the blocking device is switchable between a fixing position and a release position, wherein in the fixing position adjustment of the steering column is blocked and in the release position adjustment of the steering column is unblocked, the method comprising:
providing a rolling bearing that supports the spindle nut, wherein rolling bodies of the rolling bearing are at least partially surrounded by magnetorheological fluid;
while switching the blocking device into the fixing position, magnetizing the rolling bodies by way of an electromagnet to increase a viscosity of the magnetorheological fluid such that rotation of the spindle nut is blocked; and
while switching the blocking device into the release position, demagnetizing the rolling bodies by way of the electromagnet to reduce the viscosity of the magnetorheological fluid such that rotation of the spindle nut is unblocked.

7. The method of claim 6 wherein the spindle nut is mounted in a transmission housing so as to be rotatable and positionally fixed relative to the guide clamp, wherein an axial movement of the threaded rod relative to the spindle nut leads to a rotation of the spindle nut.

8. The method of claim 6 wherein the threaded rod is movable without self-locking.

9. The method of claim 6 wherein the blocking device is a first blocking device, wherein the steering column comprises a second blocking device, the method comprising fixing a length of the steering column with the first blocking device and fixing a height of the steering column with the second blocking device.

10. The method of claim 6 comprising energizing the electromagnet such that in a crash event the spindle nut is rotatable with a predefined braking moment.

11. A method for controlling a steering column comprising:
while switching a blocking device into a fixing position where adjustment of the steering column is prevented, magnetizing rolling bodies of a rolling bearing that are at least partially surrounded by magnetorheological fluid by way of an electromagnet to increase a viscosity of the magnetorheological fluid such that rotation of a spindle nut supported by the rolling bearing is blocked; and
while switching the blocking device into a release position where adjustment of the steering column is permitted, demagnetizing the rolling bodies by way of the electromagnet to reduce the viscosity of the magnetorheological fluid such that rotation of the spindle nut is unblocked.

12. The method of claim 11 wherein the spindle nut is mounted in a transmission housing so as to be rotatable and positionally fixed relative to a guide clamp, wherein an axial movement of a threaded rod relative to the spindle nut leads to a rotation of the spindle nut.

13. The method of claim 11 wherein the threaded rod is movable without self-locking.

14. The method of claim 11 wherein the blocking device is a first blocking device, the method comprising fixing a length of the steering column with the first blocking device and fixing a height of the steering column with a second blocking device.

15. The method of claim 11 comprising energizing the electromagnet such that in a crash event the spindle nut is rotatable with a predefined braking moment.

* * * * *